United States Patent Office 3,083,185
Patented Mar. 26, 1963

3,083,185
UREA FORMALDEHYDE RESIN COMPOSITIONS CONTAINING ADDUCTS OF SULFUR OXIDES AND ALIPHATIC TERTIARY AMINES
Jack Dickstein, Leominster, Mass., assignor to The Borden Company, New York, N.Y., a corporation of New Jersey
No Drawing. Filed May 18, 1959, Ser. No. 813,647
6 Claims. (Cl. 260—71)

This invention relates to stable compositions comprising an acid curing thermosetting aminoplast resin, herein called "heat curable," and a latent catalyst of curing admixed therewith.

The invention is particularly useful with the urea-formaldehyde resins in aqueous compositions and will be illustrated by description in connection with such use.

The usual acid curing catalysts for such resins cause premature curing of the resin on contact with water unless the catalyst is admixed shortly before the resin is to be used.

Briefly stated, my invention comprises an aqueous urea-formaldehyde dispersion, a solution being an example, and a complex of tertiary amine and an inorganic acid anhydride admixed therewith and serving as a latent, heat activatable catalyst.

My composition is one that may be mixed with the urea-formaldehyde resin in aqueous solution and then shipped or stored for 24 days or longer before the resin is to be used. When the resin is finally subjected to curing, at the usual elevated temperature, it does not precure objectionably during the rise of temperature to the critical point or in the preformer such as used in making particle board. Odor tests and also analytical determinations show a large decrease in formaldehyde liberation and loss in use of my resin and curing agent composition and also from the final cured product, as compared to that experienced with the usual solution of urea-formaldehyde resin and catalyst.

As the aminoplast resin to be cured, I use a condensate of urea, thiourea, dicyandiamide, or melamine with an aldehyde such as formaldehyde, acetaldehyde, benzaldehyde and furfural. The aminoplasts may be used separately or in mixtures with each other, as in the form of a urea-melamine-formaldehyde resin and urea-thiourea-formaldehyde resin. In these condensates any commercial proportion of the aldehyde to the other component is used, as for instance 1–3 moles and usually 1.5–2 moles of the aldehyde to 1 mole of urea, and to an amount equivalent, in providing nitrogen groups reactive with formaldehyde, of melamine or other alternative for the urea.

The latent, heat activatable curing agent is an adduct of a tertiary amine with an anhydride of an inorganic acid of strength as an acid at least equal to that of phosphorous acid, that is, of ionization constant at least $10^{-5}$.

Anhydrides that meet these requirements and illustrate the class to be used are sulfur di-, tri-, and heptoxides.

Examples of amines that meet the requirements and that can be used are trialkylamines having 1–18 carbon atoms to each alkyl group, as in trimethyl, triisopropyl, tributyl and trioctylamine; mixed tertiary amines containing two or more different alkyl groups stated such as dimethylethyl and ethyldimethylamine; tertiary amines containing one or more alkanol groups, as for example mono-, di, or trialkanolamines having 1–10 carbon atoms in each alkanol group and containing $C_1$–$C_{18}$ alkyl groups in number if any required to make a total of three alkanol and alkyl groups; any $C_1$–$C_{18}$ alkylene polyamine in which each amine group is tertiary and which is of the formula $$N(R')_2 \cdot A \cdot (NR'')_x \cdot A \cdot N(R''')_2$$

in which R', R'' and R''' represent any $C_1$–$C_4$ alkyl group, A any $C_1$–$C_4$ alkylene group, and $x$ an integral number within the range 1–4, and an aromatic amine as for instance any di-$C_1$–$C_4$ alkyl N-substitution product of aniline, toluidine, lutidine, collidine, or like substitution products of aniline. For most convenient use, I ordinarily select from the classes stated the amines of low molecular weight. Thus I obtain a good solubility in water and low molecular weight of adduct for a given content of acid forming material.

In general, the adducts that I use are Lewis type salts of the amines with the inorganic anhydrides, that is, salts in which the base has transferred an electron pair to the acid, here the amine to the anhydride.

MAKING THE ADDUCT

Those of the adducts that are not known or described in the literature are made in the following manner: I mix the selected amine and anhydride that are to comprise the adduct in an organic solvent for each of the selected materials that is a non-solvent for the adduct to be made, so that the adduct separates as formed and a good yield of the adduct results. Solvents that may be used are chloroform, hexane, ether, and carbon tetrachloride. The amine and the anhydride are used in proportions that are equivalent, that is stoichiometric for the formation of the Lewis type salt. The amine, anhydride and solvent may be mixed cold and excessive rise of temperature prevented by external cooling of the mixture. A more convenient method is to add one of the reactants slowly to the mixture of solvent with the other reactant, so that the exothermic reaction is relatively easily moderated. The whole is stirred. A suitable temperature for the reaction is $-10°$ to $+20°$ C., the exact temperature permissible depending upon the boiling point of the solvent and the temperature at which the reaction becomes uncontrollable. The reaction is continued until there is no further substantial evolution of heat and no further precipitation of the adduct.

The adduct is then filtered from the remaining liquid.

This general method for preparation of the adducts is illustrated in detail by the following specific example of it.

To a cold stirred solution of 20.7 parts (0.351 mole) of trimethylamine in 289 parts of chloroform, cooled externally with Dry Ice and alcohol, 26 parts (0.325 mole) sulphur trioxide were added gradually by means of a dropping funnel. (The sulphur trioxide may be introduced in the form of Sulfan, a stabilized liquid form of sulphur trioxide.) The resulting mixture was stirred for 15 minutes. 35 parts ether were then added. After 10 minutes more stirring, the white precipitate, the adduct $(CH_3)_3N \cdot SO_3$ was isolated by suction filtration, washed three times with chloroform and once by ether, partly dried on the filter in air and finally overnight at room temperature under vacuum. The melting point of the product was 240° to 241° C. and the yield, calculated on the basis of the $SO_3$ used, was 97% of theory.

In making other adducts, I simply substitute the amine here used by an equivalent proportion of the other selected amine and the sulfur trioxide by the equivalent proportion of any of the other anhydrides disclosed.

CURING THE RESIN-ADDUCT COMPOSITION

Proportions of the adduct to be used in curing the resin vary somewhat with the proportion of the anhydride to other groups in the adduct. Suitable proportions are 0.05%–1% of the weight of the resin on the dry basis. Larger proportions are unnecessary, amounts actually used in most cases being about 0.1%–0.6%.

In the use of the new aminoplast resin and adduct mixture in aqueous compositions, curing is effected at a temperature within the range about 75°–180° C. If the resin and adduct mixture is curable much below 75° C., in the time permitted for the commercial curing, there will be appreciable precuring during storage or shipment which would weaken the strength to be obtained on completion of the cure. Above 180° C., on the other hand, the curing becomes inconvenient because of the high steam pressure or special equipment required. Ordinarily I cure the resin and adduct composition, as in a particle board or plywood board, at a temperature or about 110°–165° C.

In general, temperatures of curing are those that are conventional for the given aminoplast and industry in which it is used.

The time of cure is that which, under the special conditions used, gives the desired strength of product, ordinarily about the maximum strength possible with the combination being bonded and with the resin and adduct used. Thus in the plying of wood veneers, I cure for about 2–8 minutes. Longer times are not required.

The water content of the compositions with which the adduct is used, when the resin composition is aqueous, should be at least 10% of the weight of the aminoplast resin and ordinarily is 20%–50%. More water, if used, increases the transportation cost and dilutes the resin objectionably.

The adducts, although substantially stable at ordinary temperatures of shipping or storage of the aqueous composition, decompose or undergo molecular rearrangement at the elevated temperatures of curing, so that the acidic component becomes active as an acid. It becomes, in fact, more effective than the usual acid added as the ammonium salts, for example. My adduct as the catalyst gives more complete cure, less of the choking odor of formaldehyde liberated in the curing room or in subsequent storage of the cured, finished product, and greater strength of the cured bond as in particle board.

In the following examples and elsewhere herein, proportions are expressed by weight and on the anhydrous basis unless specifically stated to the contrary.

*Example 1*

A condensation product of urea and formaldehyde in the molar ratio of 1:1.8 and containing 65% solids and about 35% water was prepared by refluxing the solution of the reactants at pH 6, followed by adding sodium hydroxide to pH 7.4–7.8, when the desired viscosity was obtained.

0.2 part of trimethylamine-sulfur trioxide adduct in finely ground condition was dissolved by vigorous stirring in 100 parts of the urea-formaldehyde concentrate containing 65% solids. This concentrate containing 0.2% latent catalyst had a storage life of 27 days at 75° F. In comparison, the same concentrate containing 0.2% ammonium sulfate gelled and became non-usable after 15 hours at the same temperature.

*Example 2*

A condensation product of urea and formaldehyde in the molar ratio of 1:1.6 was prepared by the process steps described in Example 1. The final concentrate (65% solids) had a storage life of 30 days at 75° C. when mixed with 0.2 part of trimethylamine-sulfur trioxide.

The above concentrate and latent catalyst gave essentially complete cure, when tested with maple laps, at 115° C. and 200 p.s.i. pressure. Under the same conditions, the uncatalyzed urea-formaldehyde preparation failed to cure.

*Example 3*

100 parts of the 65% solids urea-formaldehyde concentrate, prepared as in Example 1 but with a molar ratio of 1 urea to 1.6 formaldehyde, was treated with 4 parts of an aqueous solution composed of 95 parts of water and 5 parts trimethylamine-sulfur trioxide at 50° C. This system had a storage life of 24 days and readily cured at 240° F. and 200 p.s.i. when tested with maple laps.

The above examples illustrate the latency imparted to acid catalyzed aminoplast resin by trialkylamine-sulfur trioxide adducts. Table I shows the remarkable improvement which can be obtained by the use of these latent accelerators in particle boards prepared with urea-formaldehyde systems, in addition to the convenience in buying a single package, ready mixed product. All boards were prepared with aspen flakes using 7 parts of the urea-formaldehyde system to 100 parts of the flakes. The press conditions were 150° C. and 200 p.s.i. The formaldehyde evolution from the boards was determined by subjecting given weights of the boards to a stream of air (12 liters per hour) at 60° C. and 81% relative humidity for a period of 105 minutes. The evolved formaldehyde was absorbed in aqueous potassium hydroxide and analyzed by a standard colorimetric procedure.

TABLE 1

| Catalyst Employed | Press Time, in Minutes | Modulus of Rupture of Board | Density of Board | Formaldehyde Evolved, Percent of Board Weight |
| --- | --- | --- | --- | --- |
| None | 5 | 2,475 | 0.598 | 0.0044 |
|  | 8 | 3,165 | 0.635 | 0.0028 |
| 0.2% Trimethylamine-Sulfur trioxide | 5 | 3,520 | 0.633 | 0.0034 |
|  | 8 | 3,362 | 0.618 | 0.0033 |
| 0.8% Ammonium Sulfate | 5 | 3,100 | 0.609 | 0.014 |
|  | 8 | 2,490 | 0.630 | 0.015 |

It will be noted that, at comparable press times, boards of much higher strength are made by the use of the latent adduct catalyzed system as compared to those obtained with no catalyst or with the conventionally used accelerator. Further evidence of the increased stability of latent catalyzed boards is shown by the low formaldehyde release of these boards as compared to those prepared by conventional catalysts. I attribute the improved results to the generation of the acidity, necessary for catalysis, abruptly for the latent catalyzed systems at normal hot press temperatures in contrast to the gradual development of the acidity in the conventionally catalyzed systems as the temperature is raised.

*Example 4*

The procedure and compositions of any of the Examples 1–3 are used except that the urea is replaced by an equivalent proportion based on amino (or amide) group content of any of the alternatives disclosed herein.

*Example 5*

The procedure and composition of any of Examples 1–4 are used except that the formaldehyde is replaced by an equi-molecular proportion of acetaldehyde, benzaldehyde, or furfural.

*Example 6*

The procedure and compositions of any of Examples 1–5 are used except that the trimethylamine-sulfur trioxide adduct there used is replaced by 0.05–1 part of any of the other tertiary amine-acid anhydride adducts disclosed herein.

*Example 7*

DRY MOLDING COMPOSITION

My composition is useful also in dry form, as a molding powder. In the absence of water, however, there is not the difficulties that my composition is intended first of all to avoid, including short pot life and premature curing that occurs when water is present in the aqueous resin composition with acid or ammonium salts as the catalysts.

An example of the dry molding composition is the following:

A urea-formaldehyde resin made from 1.5 moles of formaldehyde and 1 mole of urea is mixed after the condensation in aqueous solution with 0.5% of the trimethylamine-sulfur trioxide complex or adduct. This aqueous mixture is then impregnated on cellulose fibers. The resulting product is dried in a vacuum at a temperature not above about 50° C. and to approximately the proportion of water, such as 5%–8%, which is in equilibrium with the alpha cellulose when exposed to the air.

The material so dried is then ready for molding according to any usual technique for molding powder, curing of the molded product being effected at a temperature which is within the range of 75°–185° C., here actually about 160° C.

In a modification of this example, the solution of the urea-formaldehyde resin is applied to the alpha-cellulose fibers, this mixture is dried as described in vacuo and then powdered, and the resulting powder is mixed with the amine-anhydride adduct. The product is ready for shipment and use as a molding powder.

It is to be understood that it is intended to cover all changes and modifications of the examples of the invention herein chosen for the purpose of illustration which do not constitute departures from the spirit and scope of the invention.

I claim:

1. In making a resin composition that is non-curing at normal temperatures and rapidly curing at temperatures within the range 75°–185° C., the process which comprises
    (a) mixing an aliphatic amine containing nitrogen solely in tertiary amine form and an acid anhydride selected from the group consisting of sulfur di-, tri- and heptoxides in an organic liquid medium that is a solvent for said amine and anhydride,
    (b) maintaining the amine and anhydride in contact in said medium until the evolution of heat of the ensuing reaction substantially ceases,
    (c) separating the resulting adduct from the remaining liquid, and
    (d) mixing said adduct into an aqueous dispersion of a heat curable urea-formaldehyde condensation product in the proportion of approximately 0.05%–1% of said adduct on the dry weight of the condensation product.

2. The composition of claim 1, the said anhydride being sulfur trioxide.

3. The composition of claim 1, said amine being a trialkylamine.

4. The composition of claim 1, said curing agent being the adduct of a trialkyl amine with sulfur trioxide.

5. The resin composition of claim 1, said adduct being of the formula $(CH_3)_3N$—$SO_3$.

6. The process of claim 1 which includes heating the resulting mixture of said adduct and said urea-formaldehyde condensation product to a temperature of about 75°–185° C. until curing is effected.

References Cited in the file of this patent

UNITED STATES PATENTS

| | | |
|---|---|---|
| 2,186,821 | Cordier | Jan. 9, 1940 |
| 2,317,181 | D'Alelio | Apr. 20, 1943 |
| 2,326,727 | Schroy | Aug. 10, 1943 |
| 2,433,680 | Backman | Dec. 30, 1947 |
| 2,688,607 | Suen | Sept. 7, 1954 |
| 2,750,355 | Ledden | June 12, 1956 |
| 2,871,209 | Shelley | Jan. 27, 1959 |
| 2,892,810 | Albrecht | June 30, 1959 |

FOREIGN PATENTS

| | | |
|---|---|---|
| 508,801 | Great Britain | July 5, 1939 |